US007813258B2

(12) United States Patent
Shintani et al.

(10) Patent No.: US 7,813,258 B2
(45) Date of Patent: Oct. 12, 2010

(54) OPTICAL INFORMATION RECORDING MEDIUM AND OPTICAL INFORMATION REPRODUCING METHOD

(75) Inventors: Toshimichi Shintani, Kodaira (JP); Hiroyuki Minemura, Kokubunji (JP); Yumiko Anzai, Ome (JP); Soichiro Eto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 494 days.

(21) Appl. No.: 11/836,883

(22) Filed: Aug. 10, 2007

(65) Prior Publication Data

US 2008/0205236 A1    Aug. 28, 2008

(30) Foreign Application Priority Data

Feb. 28, 2007    (JP)    ............... 2007-048330

(51) Int. Cl.
    *G11B 3/70*    (2006.01)
(52) U.S. Cl. .................. 369/284; 369/283; 369/285
(58) Field of Classification Search ............... 369/47.5, 369/275.2, 283, 284
    See application file for complete search history.

(56) References Cited

U.S. PATENT DOCUMENTS

| 2001/0015949 | A1 | 8/2001 | Nagase et al. | |
|---|---|---|---|---|
| 2005/0041571 | A1* | 2/2005 | Ichihara et al. | ............. 369/285 |
| 2005/0208257 | A1* | 9/2005 | Cheong et al. | ............. 428/64.4 |
| 2005/0213487 | A1 | 9/2005 | Yamamoto et al. | |
| 2006/0072434 | A1 | 4/2006 | Shintani et al. | |
| 2006/0203696 | A1 | 9/2006 | Mori et al. | |
| 2006/0262711 | A1 | 11/2006 | Shintani et al. | |

FOREIGN PATENT DOCUMENTS

| JP | 05-159357 | 6/1993 |
|---|---|---|
| JP | 05-282674 | 10/1993 |
| JP | 07-244870 | 9/1995 |
| JP | 2001-273679 | 10/2001 |
| JP | 2006-107588 | 4/2006 |

OTHER PUBLICATIONS

Masataka Shinoda, et al.; High-Density Near-Field Readout over 50 GB capacity Using Solid Immersion Lens with High Refractive Index; Japan Society of Applied Physics; Feb. 2003; pp. 1101-1104; vol. 42; Part 1; No. 2B.

Kouichi Yasuda, et al.; Premastered Optical Disk by Superresolution; Japan Applied Physics; Nov. 1993; pp. 5210-5213; vol. 32; Part 1; No. 11B.

(Continued)

*Primary Examiner*—Wayne R Young
*Assistant Examiner*—Adam R Giesy
(74) *Attorney, Agent, or Firm*—Antonelli, Terry, Stout & Kraus, LLP

(57) ABSTRACT

A disc structure for making an inverted optical response through a super-resolution process using a recorded mark portion and a space portion, which is realized to amplify a signal amplitude and solve a conventional problem that a conventional super-resolution technique can obtain only small signals, since the super-resolution area is reduced to realize high density recording of data.

2 Claims, 7 Drawing Sheets

OTHER PUBLICATIONS

Toshimichi Shintani, et al.; Sub-Terabyte-Data-Capacity Optical Discs Realized by Three-Dimensional Pit Selection; Japanese Journal of Applied Physics; 2006; pp. 2593-2597; vol. 45, No. 4A.

Nobuyuki Takamori, et al.; Dual-Layer Energy-Gap-Induced Super-Resolution Read-only-Memory Disc Using ZnO Film; Japanese Journal of Applied Physics; 2006; pp. 1366-1369; vol. 45, No. 2B.

Masashi Kuwahara, et al.; Thermal Origin of Readout Mechanism of Light-Scattering Super-Resolution Near-Field Structure Disk; Japanese Journal of Applied Physics; 2004; pp. L8-L10; vol. 43; No. 1A/B.

Jia-Reuy Liu; et al.; Erasable Phase Change Disks with Super Resolution Capability by Pulse-Readout;; Japanese Journal of Applied Physics; May 1, 1998; pp. L516-L518; vol. 37; Part 2; No. 5A.

* cited by examiner

*FIG. 1A*   *FIG. 1B*
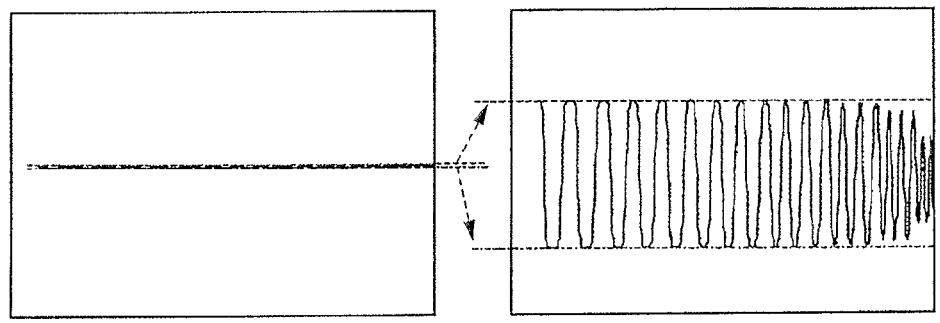
(PRIOR ART)
*FIG. 2A*   *FIG. 2B*
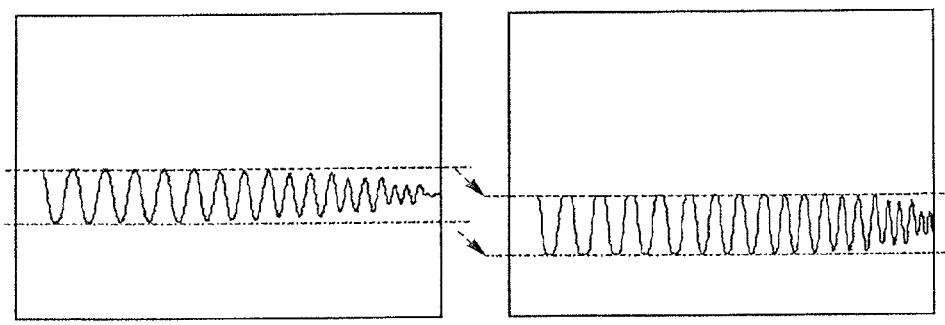

OPTICAL INFORMATION RECORDING MEDIUM AND OPTICAL INFORMATION REPRODUCING METHOD

CLAIM OF PRIORITY

The present application claims priority from Japanese application JP 2007-048330 filed on Feb. 28, 2007, the content of which is hereby incorporated by reference into this application.

FIELD OF THE INVENTION

The present invention relates to a large capacity optical disc technique, more particularly to an optical information recording medium preferred to recording of mass information and an information reproducing method preferred to reproducing of information recorded on the optical information recording medium.

BACKGROUND OF THE INVENTION

In recent years, progress of mass information recording techniques has been advanced on research and development of high density optical recording techniques capable of storing information as much as possible in a unit area. The optical disc technique having been applied practically to products so far focuses a laser light on an object disc through a lens to read out and/or record data from/on the disc. To realize such high density recording of data, efforts have been made to reduce the size of the focused laser spot. The spot size is proportional to $\lambda/NA$ if the light source wavelength is defined as $\lambda$ and the numerical aperture of the objective lens is defined as NA. In other words, the amount of information to be stored on a disc has been increased by decreasing the light source wavelength and increasing the lens NA. If a set of a light source wavelength, an objective lens NA, and a capacity of data stored in a disc of 12 cm in diameter is represented as (wavelength, NA, and capacity), (780 nm, 0.5, and 650 MB) is assumed for CDs and (650 nm, 0.6, and 4.7 GB) is assumed for DVDs. A technique that uses a blue laser light source has proposed two types of such sets; (405 nm, 0.85, and 25 GB) and (405 nm, 0.65, and 20 GB). This recording capacity makes it possible to record high definition TV image data for about 2 hours.

However, any of the above described recording capacities is insufficient for professional systems and security systems used, for example, in broadcasting stations. In those broadcasting stations, it is required to record more than 100 GB on one disc. There are image data required to be stored for a long period, for example, from several tens of years to about 100 years. Such mass data is required to be stored on one disc as much as possible because of the limit of places for having those media in the custody. The required capacity of one disc is several hundreds of GB to more than 1 TB.

Any of the above described recording methods will be difficult to cope with recording of such mass data because of the following problems. At first, realizing a short wavelength for light sources is difficult, because development of a semiconductor laser diode usable as such a light source is very difficult and even when such a semiconductor laser diode is developed successfully, the light source is of an ultraviolet light. Thus the disc substrate and the protective film come to absorb the light, thereby it is considered to be difficult to secure a favorable recording/reproducing quality. A research of increasing the objective lens NA is in progress now. For example, the Japanese Journal of Applied Physics Vol. 42, pp. 1101 to 1104 reports such a technique when the NA is assumed to be 1.8. In such a case, because a light used for recording/reproducing data is not an ordinary propagating light, but a light localized at a lens, which is referred to as a near-field light, this system is required to have a mechanism for getting the lens so close to the surface of the object disc and moving the lens above the disc while the distance between the lens and the disc surface is kept. The system is similar to a magnetic recording hard disk and the optical discs' merit, removability of discs, is sacrificed.

Under such circumstances, there has been proposed a method for improving the optical resolution effectively by providing a disc with a mechanism. Here, this method is referred to as a super-resolution technique.

The Japanese Journal of Applied Physics Vol. 32, pp. 5210 to 5213 reports such a super-resolution technique that uses a phase-change recording film. Usually, the phase-change recording film is used for the recording film of such rewritable discs as CD-ROM, DVD-RAM, DVD±RW, Blu-ray Discs. Here, this recording material is not used for a recording film, but used for a layer that improves the optical resolution effectively just like the read-out layer of the above described optical magnetic disc. The layer (film) is referred to as a super-resolution layer (film). This method deposits a phase-change recording film in a sputtering process and part of the recording film is melted upon reading out signals. If the reflectivity of the subject disc is higher enough at the melted portion, signals obtained from the melted portions become dominant over other signals. This means that phase-change film melted portions become effective readout light spots. Because the area of each melted portion is smaller than the optical spot, the readout optical spot is reduced substantially, thereby the optical resolution is improved.

The JP-A No. 2006-107588 proposes a method for obtaining such a super-resolution effect by advancing that method to form pits with a phase-change material and to melt individual pits upon reading out signals. According to this proposal, a phase-change etching method is used to form pits of the phase-change material. The phase-change etching is a technique for forming such pits by transforming a phase-change mark pattern to a pit pattern with good use of a difference of solubility between crystal portion and amorphous portion of the phase-change film with respect to an alkaline solution. According to this method, a substance that shows the super-resolution effect exists only in mark portions and the space portions are not required to absorb the light, so that the method can improve the optical transmittance of one layer and makes it possible to combine the super-resolution technique with a multi-layer technique. The Japanese Journal of Applied Physics Vol. 45, pp. 2593 to 2597 reports an example in which this method is used to realize a dual-layer super-resolution disc. This method is referred to as a pit type super-resolution technique and an example in which super-resolution films are deposited consecutively two-dimensionally as described above is referred to as a thin film super-resolution technique.

The Japanese Journal of Applied Physics Vol. 45, pp. 2593 to 2597 also reports an example that has realized a dual-layer super-resolution disc with another method. According to this method, a semiconductor is used as a super-resolution material. The band gap is in an ultraviolet light wavelength area at room temperature and in a visible light wavelength area at high temperatures. A thin film that absorbs a light is deposited around this super-resolution thin film. As a result, the temperature rises where the light spot intensity is high on the light absorbing thin film and the heat is transmitted to the super-resolution thin film, thereby the band gap of an area smaller than the light spot comes in a visible light area. Consequently, the readout light is reflected therefrom. In other words, readout signals are obtained only in areas smaller than the light spot, so that the super-resolution effect is obtained. In this example, ZnO is used as the super-resolution material.

A recording type super-resolution technique is also proposed. For example, the Japanese Journal of Applied Physics Vol. 43, pp. L8 to L10 reports a method for improving the recording density. According to the method, laser pulses are irradiated on a disc having both a platinum oxide film and a phase-change recording film using the same method as that for recording marks on an ordinary recordable optical disc, thereby recording marks, then reading out signals through a super-resolution reading-out process. This method irradiates a recording laser power on the object disc, then the platinum oxide film is expanded locally, thereby the thickness of the phase-change film is modulated according to each of the marks. Upon reading out signals, only the thin portions of the phase-change film are melted. Thus the super-resolution effect is obtained. Such way, this method realizes the write-once super-resolution optical disc.

On the other hand, the Japanese Journal of Applied Physics Vol. 37, pp. L516 to L518 reports a method for realizing a rewritable disc by adapting the method disclosed in the Japanese Journal of Applied Physics Vol. 32, pp. 5210 to 5213, which uses a phase-change film as a super-resolution film. This method reads out signals without erasing the phase-change marks recorded on the recording film while melting the super-resolution film upon reading out signals by using two types of phase-change films as a super-resolution film and a recording film respectively and adjusting the light absorptivity in each phase-change film according to the film thickness. This method selects a material so that the crystallization time of the phase-change material used for the recording film becomes slower than that of the super-resolution film. Consequently, recorded marks cannot be erased so easily upon reading out signals, thereby the required readout proof can be assured.

The JP-A No. 2001-273679 also discloses a method that provides the object medium with multiple layers and makes most use of the optical interference so as to maximize the reflectivity of the super-resolution area (aperture portion) in the light spot or minimizes the reflectivity of the non-super-resolution area (masking portion), thereby obtaining a higher super-resolution effect. This method is also aiming at increasing of the signal amplitude in the super-resolution reading-out process by paying attention only to the optical properties in the light spot.

SUMMARY OF THE INVENTION

In the case of the above described super-resolution techniques, the thermal distribution that occurs in the subject medium due to an incident light is utilized to form areas having different optical properties such as a refractive index in the light spot from each other, thereby dissolving a high frequency mark that cannot be dissolved in any conventional optical systems and improving the resolution. Among those techniques, the thin film type super-resolution technique adopts the same laminated film structure in all the data areas of the subject medium. Thus the optical change levels in those data areas are all the same. This will be described with reference to FIG. 2. (a) in FIG. 2 is a diagram for describing an amount of readout signals obtained in a super-resolution reading-out process, those readout signals being standardized with a readout light power (readout signal level/readout power) when a low light power is used for reading out signals. What is shown here is signals used to read out a mark array of which size is reduced gradually from left to right in the figure. Upon making a comparison of the reflectivity change between a mark existing portion (marked portion) formed by a super-resolution spot and a portion between marks (space portion), the change level is the same between the marked portion and the space portion. However, because the effective readout light spot size is reduced, the small mark signal amplitude increases. To realize high density recording, however, the super-resolution spot is required to be reduced in size. Accordingly, the super-resolution signals are reduced in size. This has been a problem. For example, if the difference of the reflectivity between the non-super-resolution portion and the super-resolution portion is assumed to be 10%, the reflectivity to be obtained here is about 2.5% because the size of the super-resolution spot is required to be ¼ of the conventional one to realize a 4-time recording density through the super-resolution process. When compared with the conventional optical disc techniques, if the difference of the reflectivity between the mark and the space is 2.5%, it is difficult to obtain a satisfactory signal-noise ratio (SNR).

FIG. 3 shows a diagram for describing a readout signal/readout power obtained with the pit type super-resolution technique described in the JP-A No. 2006-107588. (a) in FIG. 3 shows a case of non-super-resolution reading-out and (b) in FIG. 3 shows a case of super-resolution reading-out. In this case, the reflectivity of the space portion makes no change, so that one of the two envelopes in the readout signal makes no change and the other changes. Even in this configuration, a mark itself functions similarly to a super-resolution spot and the change level of the reflectivity of a mark caused by a heat and the mark size are proportional to the signal amplitude.

This is why any of the conventional super-resolution techniques is difficult to obtain a satisfactory signal amplitude.

Under such circumstances, the present invention aims at solving the above conventional problems by adopting different values for the change levels of the optical properties of the space portion and the mark portion. In other words, if the reflectivity of the space portion in a super-resolution reading-out process becomes higher than that in a non-super-resolution reading-out process, the reflectivity of the mark portion is reduced. FIG. 1 shows a diagram for describing how this situation is to be realized. If this situation is realized, it is possible to obtain a signal amplitude larger than those in the cases shown in FIGS. 2 and 3. In FIG. 1, (a) shows a signal in a non-super-resolution reading-out process and (b) shows a signal in a super-resolution reading-out process. In FIG. 2, (a) shows a signal in a non-super-resolution reading-out process and (b) shows a signal in a super-resolution reading-out process. In FIG. 3, (a) shows a signal in a non-super-resolution reading-out process and (b) shows a signal in a super-resolution reading-out process.

This is achieved by adjusting the laminated film layer of the subject disc.

FIGS. 4A and 4B shows a cross sectional view of a recording type thin film super-resolution disc. An incident light 400 is focused on a disc. The disc consists of a substrate 401, a protective film 402, a recording film 403, a protective film 405, a super-resolution film 406, a protective film 408, and a substrate 409 that are arranged sequentially from a side near to the light incidence side. The positions of the recording film 403 and the super-resolution film 406 may be inverted. The recording film 403 has marks 404 corresponding to recorded data. The incident light 400 makes a partial change of the optical properties of the super-resolution film to form super-resolution areas 407. Because each of the super-resolution areas 407 is smaller than the light spot formed by the incident light 400, it is possible to read out the marks smaller than the resolution determined by the size of the light spot. FIG. 4A shows a case in which each super-resolution area 407 exists in a space portion of the recording film 403. FIG. 4B shows a case in which each super-resolution area 410 exists on a recorded mark. To realize the state shown in FIG. 1 on this disc, the laminated film layer of the disc is adjusted to make good use of the optical interference between each of the protective films 402, 405, and 408, the recording film 403, the super-resolution areas 407 and 410, and each of the space and mark portions of the recording film 403. For example, if the incident light 400 passes through the substrate 401→the protective film 401→the space portion of the recording film 403→the protective film 405→the super-resolution area 407→the protective film 408→and the substrate 409 sequentially, the reflectivity becomes larger than a case in which there is no super-resolution area 407. If the incident light 400 passes through the substrate 401→the protective film 401→the recorded mark 404→the protective film 405→the super-resolution area 407→the protective film 408→and the substrate 409 sequentially, it is just required to reduce the reflectivity more than a case in which there is no super-resolution area 410. In addition, because the optical properties differ between the recorded mark 404 and the space portion of the recording film 403, the light volume to be absorbed differs between the two super-resolution areas 407 and 410. As a result, the temperature differs between the super-resolution areas 407 and 410. Consequently, the size and optical properties come to differ between those areas 407 and 410. The state shown in FIG. 1 can also be realized by taking this into consideration.

While a case of the recording type thin film super-resolution disc has been described so far, the case can also apply to the ROM in which pits are formed instead of the recorded marks. This case applied to the ROM will be described below with reference to FIGS. 5A and 5B. In FIGS. 5A and 5B, an incident light 500 comes into an optical disc. The disc is composed of a substrate 501, a protective film 502, a super-resolution film 503, a protective film 505, and a substrate 506 that are arranged sequentially from a side near to the light incidence side. The substrate 506 has pits 507 corresponding to recorded data. FIG. 5A shows a case in which each super-resolution area 504 exists on a space. FIG. 5B shows a case in which each super-resolution area 508 exists on a pit. In this case, the protective film 2 (505 in FIG. 5A) becomes thick just by the depth of each pit 507, so that the phase of the obtained reflectivite light differs between FIG. 5A and FIG. 5B. Making good use of this phase difference together with optical interference enables the reflectivity to be controlled by up to a certain point, thereby the state shown in FIG. 1 is realized.

The pit type super-resolution technique described in the JP-A No. 2006-107588 can also generate the state shown in FIGS. 4A and 4B by making good use of the difference of the optical interference between the space portion and the mark portion similarly to the above example. This will be described below with reference to FIGS. 6A and 6B. At first, a laser beam 600 comes into a disc. The disc is composed of a substrate 601, a protective film 602, a super-resolution assist film 603, a protective film 605, and a substrate 606 that are arranged sequentially from a side near to the light incidence side. A super-resolution material is embedded in each recorded pit formed in the substrate 606 and the pit is referred to as a super-resolution pit 607. The optical properties of part 604 of the super-resolution assist film 603 change due to the incident light. In FIG. 6B, if the incident light 600 is irradiated on a super-resolution pit 607, the optical properties of the pit change, thereby the pit is transformed into a super-resolution pit. At this time, the pit 608 comes to differ in optical properties from others, so that a single pit 608 can be read out even when there are many pits in the readout light spot. Here, the state shown in FIG. 1 can be realized by adjusting the optical interference between cases shown in FIGS. 6A and 6B.

One of the features of the pit type super-resolution technique is a combination of the super-resolution technique and the multilayer technique to realize a large capacity for recording data. In order to realize such an object, it is required to improve the optical transmittance of the space portion. However, because the super-resolution assist film 603 is required to absorb the subject light in the case of the technique shown in FIGS. 6A and 6B, it is difficult to improve the optical transmittance. The Japanese Journal of Applied Physics Vol. 45, pp. 2593 to 2597 discloses a method for solving the problem. According to the method, a wide band gap (WBG) semiconductor can be used. The wide band gap is assumed in an ultraviolet light area at room temperature and in a visible light area at high temperatures. This will be described below with reference to FIGS. 7A and 7B. The configuration shown in FIGS. 7A and 7B is almost similar to that shown in FIGS. 6A and 6B except that the super-resolution assist film 603 shown in FIGS. 6A and 6B is substituted for a WBG thin film 703 in FIGS. 7A and 7B. In the WBG thin film 703, the band gap is in an ultraviolet light area, so that the film 703 is transparent with respect to a visible light. If a readout light 700 is irradiated on a super-resolution pit 707, a heat is generated in the super-resolution pit 707 and transmitted to the WBG thin film 703, thereby the band gap in the high temperature portion 704 of the WBG thin film is reduced in size. Accordingly, the band gap becomes a visible light area. Consequently, the area comes to absorb the visible light.

To read out signals from a multilayered optical disc having such a structured recording layer, the incident light 700 is not focused in the non-readout layer, thereby the light power density on the non-readout layer is small and almost no heat is generated in the super-resolution pits. As a result, the WBG thin film is kept transparent. Consequently, the transmittance of the non-readout recording layer is kept high, so that the super-resolution multilayer optical disc as described above is realized.

As such WBG materials, it is possible to use ZnO, $Ti_2$, $SrTiO_2$, ZnS, $CeO_2$, etc.

In FIG. 7A, the incident light 700 is irradiated on the space portion separately from each super-resolution pit. However, in the case of the high density optical disc, the pit size and the space size are smaller than the readout light spot, so that the temperature in each space portion rises. In addition, once the temperature in the space portion rises and the space portion begins absorbing the light, a heat is generated not only in the super-resolution pit, but also in the WBG thin film. The heat causes the thin film band gap to be further reduced; thereby, the band gap comes to absorb the light more. This phenomenon is self-consistently converged to some point. Thus the temperature distribution in the WBG thin film is kept in a certain state. This state is disturbed by heat transfer from each super-resolution pit, but this disturbance depends on the pit arrangement, pit size, space size, etc. In other words, the distribution of the changes of the optical properties in the WBG thin film affects recorded signals, so that this disturbance can be adopted for reading out signals.

In the case of the super-resolution technique for reading out recorded marks smaller than the optical resolution, it is possible to reduce the data error rate by improving the signal amplitude.

BRIEF DESCRIPTION OF THE DRAWINGS

FIG. 1 is a diagram for describing a readout signal of an optical disc according to the present invention;

FIG. 2 is a diagram for describing a readout signal obtained by a conventional thin film type super-resolution disc;

DETAILED DESCRIPTION OF THE PREFERRED EMBODIMENTS

First Embodiment

Figures 3A, 3B:
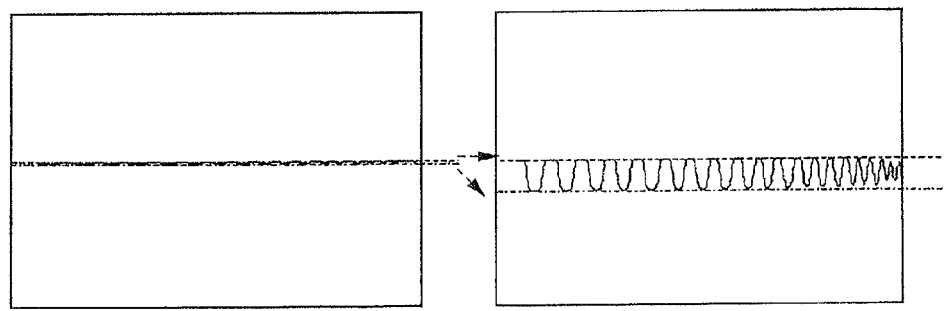
FIG. 3 is a diagram of a readout signal obtained by a conventional pit type super-resolution disc.
Figure 4A:
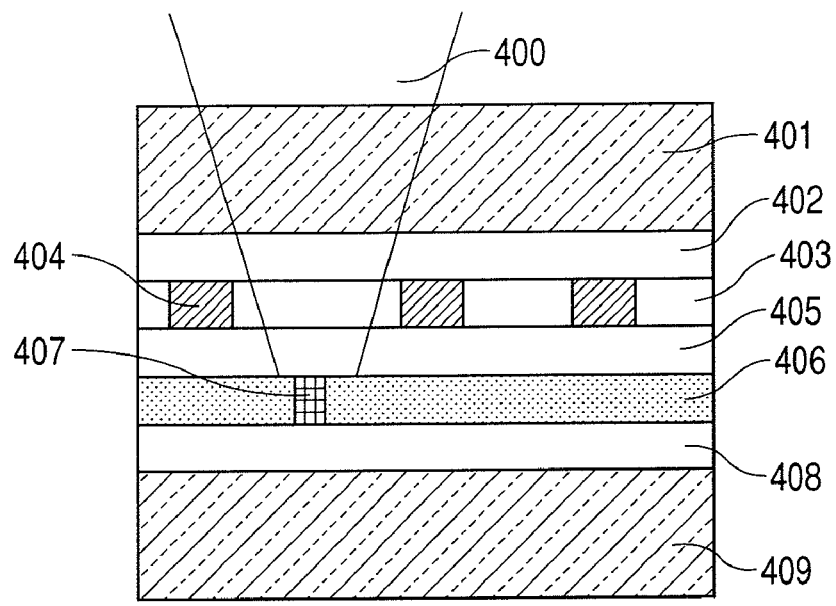
FIG. 4A and FIG. 4B show a structure of a thin film type recording super-resolution disc.
Figure 4B:
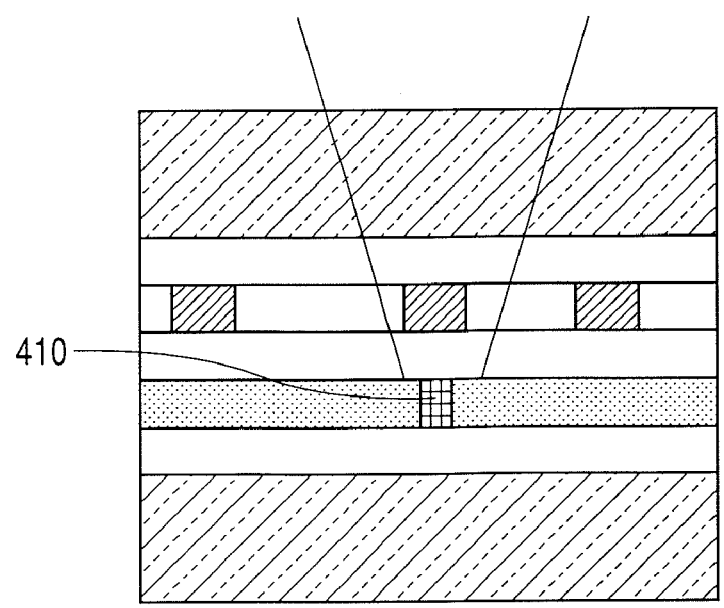

At first, a case of recording type thin film super-resolution will be described with reference to FIGS. 4A and 4B.

In this embodiment, two discs were manufactured. One (structure A) of the discs was designed in accordance with the guidance of the conventional techniques. The other disc (structure B) was designed in accordance with the guidance of the present invention. Each of the discs was composed as follows sequentially from a side near to the light incidence side.

Structure A: ultraviolet curable resin 100 μm/ZnS—SiO$_2$ (50 nm)/GeSbTe(20 nm)/ZnS—SiO$_2$(20 nm)/Ga(40 nm)/ZnS—SiO$_2$(50 nm)/Al(100 nm)/polycarbonate substrate Structure B: ultraviolet curable resin 100 μm/ZnS—SiO$_2$ (30 nm)/GeSbTe(20 nm)/ZnS—SiO$_2$(30 nm)/Ga(10 nm)/ZnS—SiO$_2$(30 nm)/Al(100 nm)/polycarbonate substrate Here, GeSbTe corresponds to the recording film 403 and Ga corresponds to the super-resolution film 406. This disc obtains the super-resolution effect by melting Ga with an incident light. In the design of the structure A, the thickness of the super-resolution film, that is, the Ga film is increased in thickness to increase the super-resolution effect. Every thin film of the disc is formed through sputtering.

The polycarbonate substrate has a tracking groove. This groove is 160 nm in width, 320 nm in pitch, and about 25 nm in depth.

Figure 8:
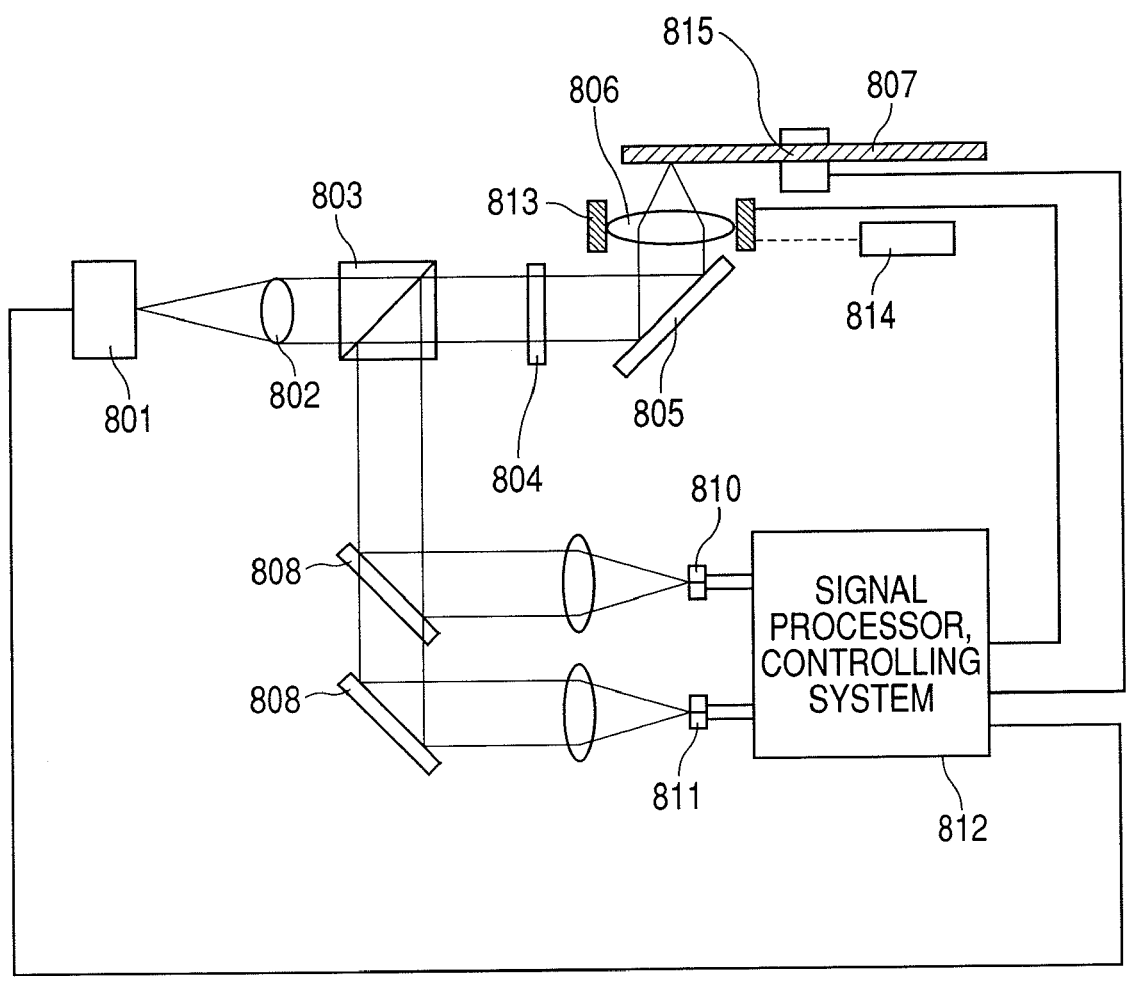
FIG. 8 is a diagram for showing a structure of an optical disc drive used to verify the effect of the present invention.

This disc is driven in an optical disc drive shown in FIG. 8 to read out signals. The drive configuration is as follows. A laser beam is emitted from a semiconductor laser diode 801 and transformed into parallel lights by a lens 802. This parallel lights pass through a polarized beam splitter 803. At this time, the laser light emitted from the semiconductor laser 801 is a linearly polarized light, but its polarizing direction in the polarized beam splitter 803 is adjusted so that the light can pass through the polarized light beam splitter 803. The laser light is converted to a circularly polarized light by a λ/4 plate 804, then passed through a mirror 805 and an objective lens 806, then focused on the disc 807. The reflected light from the disc 807 passes through the objective lens 806 and the mirror 805, then is converted to a linearly polarized light by the λ/4 plate 804. The angle of the linearly polarized light is changed by 90 degrees from that of the light emitted from the laser diode 801. Therefore, if this light enters to the polarizing beam splitter 803, the light path is bent by 90 degrees, then the light is inputted to the focus servo signal detector 810 and to the readout signal/tracking servo signal detector 811 respectively. Signals output from those two detectors are inputted to a signal processor/controlling system 812. At the same time, the radial position of the head is detected by a laser interferometer 814 and the signal is inputted to the system 812. This system 812 controls the auto focusing servo signal, the tracking servo signal, the laser pulse generation signal, the disc rotation speed, etc.

Here, the wavelength of the semiconductor laser diode 801 is 405 nm and the numerical aperture of the objective lens is 0.85.

Table 1 shows a reflectivity of the above disc, the maximum and minimum values (readout signal levels) of the envelope of a readout signal obtained in a drive when the wavelength of the light is 405 nm.

TABLE 1

|  | Structure A (prior art) | | | | Structure B (this invention) | | | |
|  | Non-super-resolution readout | | Super-resolution readout | | Non-super-resolution readout | | Super-resolution readout | |
|  | Space | Mark | Space | Mark | Space | Mark | Space | Mark |
| Reflectivity | 16.3% | 6.7% | 9.9% | 1.1% | 15.2% | 5.4% | 20.7% | 3.2% |
| Readout signal level (mV/mW) | 489 | 407 | 297 | 221 | 456 | 372 | 621 | 471 |
| Signal amplitude | 82 | | 76 | | 84 | | 150 | |
| Data error rate | | | $2.2 \times 10^{-3}$ | | | | $9.7 \times 10^{-5}$ | |

The readout power is determined as 0.3 mW for non-super-resolution reading-out and 1.5 mW for super-resolution reading-out. The readout signal level shown in Table 1 is standardized with this readout power. As shown clearly in Table 1, the signal amplitude in a super-resolution reading-out process from the disc of the structure B of the present invention is about double that from the disc of the conventional structure B. Consequently, the signal-noise ratio (SNR) is improved by about 6 dB.

Marks were recorded on this disc and the data error rate in the reading-out process was measured. The recorded marks are 1-7 modulated random pattern data of which minimum mark length was 100 nm. The linear speed of the disc was set at 5 m/s for both recording and reading-out. The measured error rate was described in Table 1 shown above. This measurement result denotes that the present invention is surely effective to improve the quality of the readout signals.

Second Embodiment

Next, the thin film super-resolution ROM disc shown in FIGS. 5A and 5B will be described.

Similarly to the first embodiment, a conventionally structured disc (structure A) and a disc of the present invention (structure B) were manufactured.

Figure 5A:
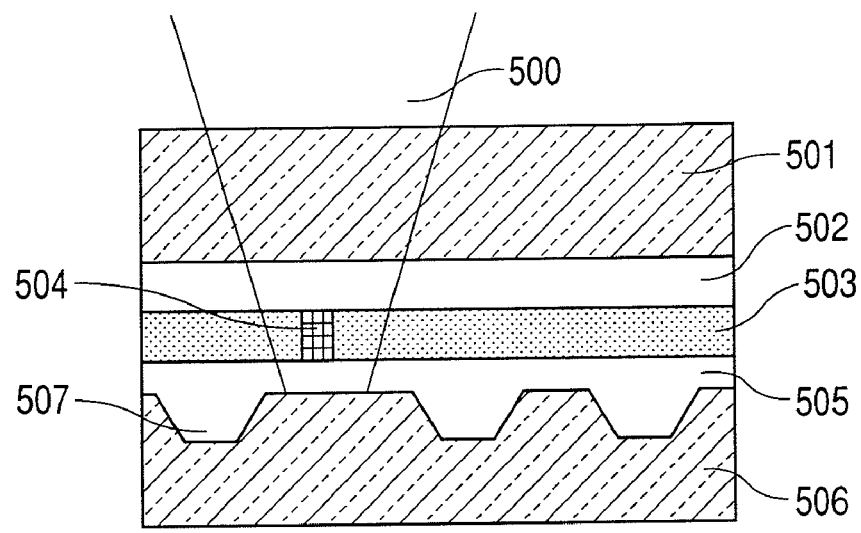
FIG. 5A and FIG. 5B show a configuration of a thin film type ROM super-resolution disc.
Figure 5B:
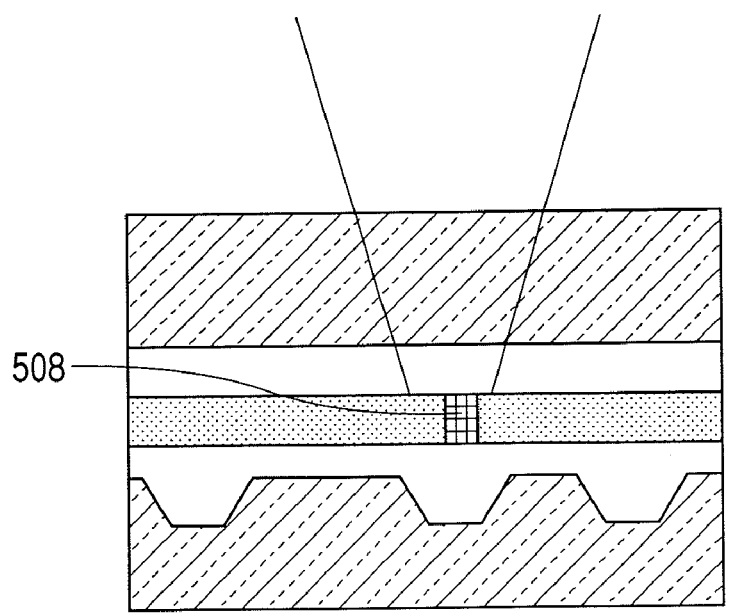
Figure 6A:
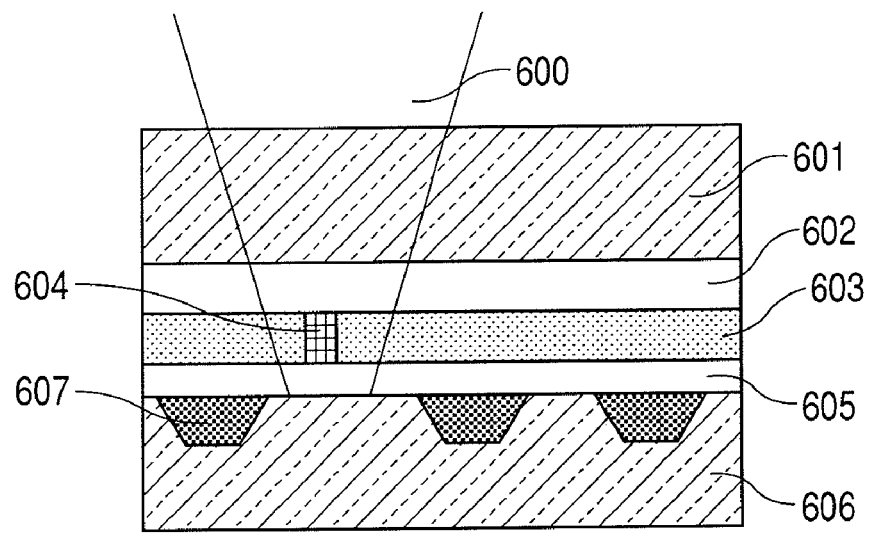
FIG. 6A and FIG. 6B show a structure of a disc obtained by providing a pit type super-resolution disc with a super-resolution assist film.
Figure 6B:
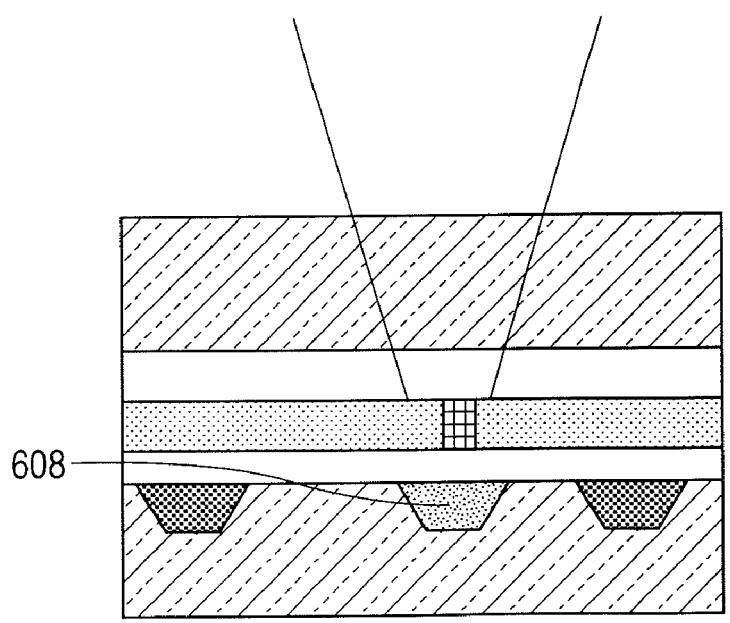

Structure A: ultraviolet curable resin 100 μm/ZnS—SiO$_2$ (30 nm)/GeSbTe(20 nm)/ZnS—SiO$_2$(30 nm)/polycarbonate substrate Structure B: ultraviolet curable resin 100 μm/ZnS—SiO$_2$ (20 nm)/GeSbTe(30 nm)/ZnS—SiO$_2$(30 nm)/Ag(42 nm)/polycarbonate substrate Each of the polycarbonate substrates has pits 507 corresponding to data as shown in FIGS. 5A and 5B. The recorded pit pattern is 1-7 modulated random pattern data of which minimum mark length was 100 nm. The pits 507 were about 41 nm in depth and 100 nm in width. The GeSbTe corresponds to the super-resolution film 503.

Similarly to the first embodiment, measurements were done for the reflectivity, signal level, and data error rate of the discs. Each disc drive configuration is the same as that in the first embodiment. The disc linear speed was 5 m/s and the readout power was 0.3 mW in non-super-resolution reading-out and 2 mW in super-resolution reading-out. Table 2 shows the measurement results.

electron beam resist was removed. The Si substrate obtained such way is referred to as a Si original disc. A Ni-plated stamper was manufactured from the original disc. The stamper having a high temperature was pressed on a disc substrate that was 1.1 mm in thickness and 120 mm in diameter to copy the stamper pit pattern onto the polycarbonate substrate, thereby manufacturing a substrate 706.

Then, Ag, ZnS—SiO$_2$, GeSbTe, and ZnS—SiO$_2$ were sputtered on the substrate 706 respectively. Then, the film of this specimen was polished in a chemical mechanical polishing process, thereby the film in each pit was kept as was and the GeSbTe in each space portion was removed. Consequently, the GeSbTe that is a super-resolution material was left over only in pits. The chemical mechanical polishing was done as follows: While slurry was supplied, a polishing pad is pressed against the surface of the specimen and this polishing pad was moved from the inner periphery to the outer periphery of the disc so that the whole surface of the disc was polished. After this, the use of the pH 13 slurry improved the solubility of the GeSbTe into the polishing solution, so that the whole disc surface was polished in about 15 seconds.

Films of ZnS—SiO$_2$, etc. were sputtered again on the polished specimen to form 100 μm ultraviolet curable resin.

Similarly to the first and second embodiments, a disc of the conventional design and of structure A and a disc of the

TABLE 2

|  | Structure A (prior art) | | | | Structure B (this invention) | | | |
| --- | --- | --- | --- | --- | --- | --- | --- | --- |
|  | Non-super-resolution readout | | Super-resolution readout | | Non-super-resolution readout | | Super-resolution readout | |
|  | Space | Mark | Space | Mark | Space | Mark | Space | Mark |
| Reflectivity | 14.1% | 14.1% | 12.9% | 12.9% | 19.4% | 19.4% | 21.8% | 21.8% |
| Readout signal level (mV/mW) | 423 | 135 | 296 | 2 | 582 | 186 | 600 | 160 |
| Signal amplitude | 288 | | 294 | | 396 | | 440 | |
| Data error rate | | | $9.8 \times 10^{-4}$ | | | | $5.2 \times 10^{-5}$ | |

As shown in Table 2, the disc of the structure B has a signal amplitude that is about 1.5 times larger than that of the structure A. As a result, the data error rate is apparently lowered.

Third Embodiment

Next, a pit type super-resolution disc will be described with reference to FIGS. 7A and 7B.

At first, how the disc shown in FIGS. 7A and 7B was manufactured will be described.

Recorded pits were formed on a substrate 706 using an electron beam drawing device. Electron beam resist was coated on the Si substrate and focused electron beam pulses were irradiated on the specimen that was rotated to expose the resist. The shortest mark length of those pits was 50 nm. Thus 1-7 modulated random patterns were formed. Pits were formed in the exposed area in a development process. After that, a CF$_4$ gas was used to form pits at a depth of 40 nm on the Si substrate in a reactive ion etching process and the residual present invention and of the structure B were manufactured. The discs were structured as follows.

Figure 7A:
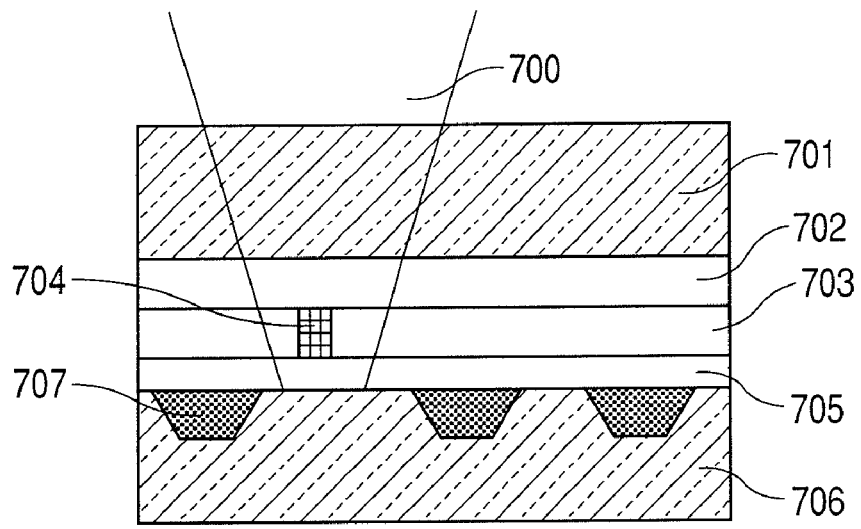
FIG. 7A and FIG. 7B show a structure of a disc obtained by providing the pit type super-resolution disc with a band gap semiconductor film.
Figure 7B:
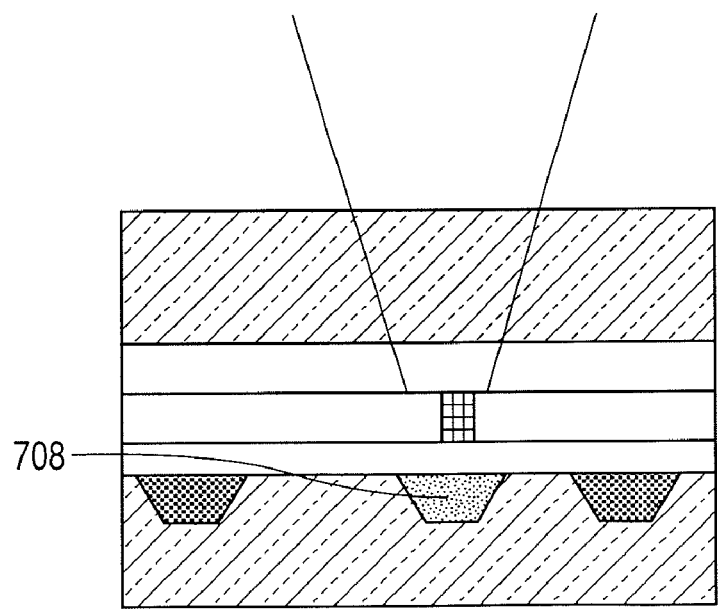

Structure A pit portion: ultraviolet curable resin/ZnS—SiO$_2$(30 nm)/GeSbTe(30 nm)/ZnS—SiO$_2$(20 nm)/Ag(10 nm)/polycarbonate substrate Structure A space portion: ultraviolet curable resin/ZnS—SiO$_2$(40 nm)/Ag(10 nm)/polycarbonate substrate Structure B pit portion: ultraviolet curable resin/ZnS—SiO$_2$(50 nm)/GeSbTe(20 nm)/ZnS—SiO$_2$(40 nm)/ZnO(30 nm)Ag(10 nm)/polycarbonate substrate Structure B space portion: ultraviolet curable resin/ZnS—SiO$_2$(70 nm)/ZnO(30 nm)/Ag(10 nm)/polycarbonate substrate The GeSbTe corresponds to super-resolution pits 707 and the ZnO corresponds to the WBG semiconductor film 703 shown in FIGS. 7A and 7B.

The above two discs were driven in the drive described in the first and second embodiments respectively to read out signals therefrom. Table 3 shows the readout results.

TABLE 3

| | Structure A (prior art) | | | | Structure B (this invention) | | | |
|---|---|---|---|---|---|---|---|---|
| | Non-super-resolution readout | | Super-resolution readout | | Non-super-resolution readout | | Super-resolution readout | |
| | Space | Mark | Space | Mark | Space | Mark | Space | Mark |
| Reflectivity | 20.1% | 19.8% | 20.1% | 8.9% | 20.6% | 21.6% | 28.3% | 7.0% |
| Readout signal level (mV/mW) | 603 | 598 | 598 | 285 | 636 | 618 | 835 | 101 |
| Signal amplitude | 5 | | 313 | | 18 | | 734 | |
| Data error rate | $1.2 \times 10^{-5}$ | | | | $5.6 \times 10^{-7}$ | | | |

The readout power was 0.3 mW in non-super-resolution reading-out and 3 mW in super-resolution reading-out. The signal amplitude in non-super-resolution reading-out was small in both discs of the structures A and B. This is because the non-super-resolution signal became a noise component in super-resolution reading-out and a disc structure was determined so as to reduce the non-super-resolution signal. Consequently, the structure A disc lowered the data error rate. However, the structure B disc had a data error rate lower than that of the structure A disc, thereby the effect of the present invention was confirmed.

The optical transmittance of the structure B disc measured with a spectrophotometer was 72%.

When the structure B disc's ZnO was changed to $TiO_2$, $SrTiO_2$, $CeO_2$, and ZnS respectively, the data error rate was $1.2 \times 10^{-6}$, $1.8 \times 10^{-7}$, $8.9 \times 10^{-7}$, and $9.3 \times 10^{-7}$. This error rate tendency is related with the band gap of each material. The light wavelengths that are equal to the band gaps of $TiO_2$, $SrTiO_3$, $CeO_2$, and ZnS at room temperature were 410 nm, 384 nm, 344 nm, and 342 nm. The $TiO_2$ band gap was narrower than the energy of the light source, so that the $TiO_2$ absorbed the light in non-super-resolution reading-out. This is why the reflectivity with respect to the super-resolution bits did not rise satisfactorily, thereby the error rate was raised. In the case of other materials, the error rate rose proportionally to an increase of the band gap. The possible reason was reduction of the reflectivity change in the space portion, as intended by the inventor, as a result of reduction of the change of the optical properties of the subject material with respect to the light source wavelength while the band gap became larger than the energy of the light source.

Fourth Embodiment

A dual-layer disc was manufactured according to the pit type super-resolution technique shown in FIGS. 7A and 7B.

The discs were manufactured as follows. The polycarbonate substrate was the same as that employed in the third embodiment. Similarly to the third embodiment, a thin film was sputtered on this substrate. The thin film was polished in a chemical mechanical polishing process, then a thin film was sputtered thereon. This layer was assumed as a recording layer in the depth when viewed from the light incidence side. This layer is referred to a second layer. Then, ultraviolet curable resin was coated on this specimen and the Ni stamper used in the third embodiment was pressed against the resin so as to cure the ultraviolet curable resin, thereby copying the stamper pattern on the resin. The ultraviolet curable resin was about 20 μm in thickness. After this, a thin film was sputtered again on this specimen and the film was polished in the chemical mechanical polishing process, and a thin film was sputtered again thereon. This layer became a recording layer at the light incidence side and the layer is referred to as a first layer. Then, ultraviolet curable resin was coated on this specimen at a thickness of 100 μm and the resin was cured.

The first layer that is a laminated one was formed similarly to that in the structure B in the third embodiment. The second layer was as follows.

Second layer pit portion: ultraviolet curable resin/ZnS—$SiO_2$(30 nm)/GeSbTe(30 nm)/ZnS—$SiO_2$(20 nm)/ZnO(30 nm)/Ag(100 nm)/polycarbonate substrate Second layer space portion: ultraviolet curable resin/ZnS—$SiO_2$(40 nm)/ZnO(30 nm)/Ag(100 nm)/polycarbonate substrate The data error rate of the first layer was $5.9 \times 10^{-7}$, which was almost the same as that of the structure B shown in Table 3 in super-resolution reading-out. This means that the data in the second layer hardly affects the readout signals in the first layer.

The data error rate of the second layer was $6.6 \times 10^{-7}$ and it was almost the same as the error rate of the first layer. This means that the readout light that passes through the first layer hardly affects signals. It was concluded that because the readout light spot in the first layer was large enough and the light power density was small, the ZnO temperature in the first layer did not rise, thereby the high transmittance of the first layer was kept as was. Consequently, the attenuation of the readout light in the first layer was small and the error rate improvement was suppressed.

As a result, it was confirmed that the present invention was effective for the dual-layer super-resolution disc.

What is claimed is:

1. A method for reproducing information as recorded data on a medium comprising the steps of:
   providing the medium, the medium having pits on a substrate and a second film, wherein a super-resolution material is embedded in the pits;
   reproducing information by irradiating a light beam on the medium;
   wherein the super-resolution material and the second film do not have a super-resolution effect when the light beam with a first power level is irradiated on the medium, and both the super-resolution material and the second film have the super-resolution effect when the light beam with a second power level being higher than the first power level is irradiated on the medium;

wherein a readout signal level derived from the light beam with the second laser power level on the pits is lower than a readout signal level derived from the light beam with the first power level on the pits; and wherein a readout signal level derived from the light beam with the second laser power level on a non-pit area is higher than a readout signal level derived from the light beam with the first power level on the non-pit area.

2. A method for reproducing information according to claim 1, wherein the second film is a semiconductor film, and a band gap is in an ultraviolet light area at room temperature and in a visible light area at a high temperature which is higher than room temperature.

* * * * *